United States Patent
Kienzle

(10) Patent No.: US 8,239,054 B2
(45) Date of Patent: Aug. 7, 2012

(54) MANUFACTURING RESOURCE PLANNING USING A COMPONENT MANAGEMENT SYSTEM

(75) Inventor: Stefan Kienzle, St. Leon-Rot (DE)

(73) Assignee: SAP AG, Walldorf (DE)

( * ) Notice: Subject to any disclaimer, the term of this patent is extended or adjusted under 35 U.S.C. 154(b) by 402 days.

(21) Appl. No.: 12/533,172

(22) Filed: Jul. 31, 2009

(65) Prior Publication Data

US 2011/0029120 A1 Feb. 3, 2011

(51) Int. Cl.
- G06F 19/00 (2011.01)
- G06F 17/50 (2006.01)
- G06Q 10/00 (2012.01)

(52) U.S. Cl. ............... 700/107; 700/97; 705/28; 705/29
(58) Field of Classification Search .................. 700/107, 700/97; 705/28, 29
See application file for complete search history.

(56) References Cited

U.S. PATENT DOCUMENTS

| | | | |
|---|---|---|---|
| 6,128,626 A * | 10/2000 | Beauchesne | 1/1 |
| 6,240,328 B1 * | 5/2001 | LaLonde et al. | 700/95 |
| 7,343,212 B1 * | 3/2008 | Brearley et al. | 700/106 |
| 2003/0187534 A1 * | 10/2003 | Suzuki et al. | 700/107 |
| 2004/0128176 A1 * | 7/2004 | Jordan et al. | 705/8 |
| 2006/0129262 A1 * | 6/2006 | Zayic et al. | 700/107 |
| 2008/0125895 A1 * | 5/2008 | Baumgartner et al. | 700/107 |
| 2008/0301010 A1 * | 12/2008 | Klim et al. | 705/28 |
| 2009/0198362 A1 * | 8/2009 | Tanoue | 700/97 |
| 2010/0217422 A1 * | 8/2010 | Takahashi | 700/107 |

OTHER PUBLICATIONS

'Release Notes for SAP Supply Chain Management Release SAP SCM 5.0' [online]. SAP, 2006, [retrieved on Aug. 4, 2009]. Retrieved from the Internet: <URL: http://help.sap.com/saphelp_scm50/helpdata/en/28/b34c40cc538437e10000000a155106/frameset.htm>, pp. 117-119.

'SAP Advanced Planner and Optimizer (SAP APO) Release 3.1' [online]. SAP, 2002, [retrieved on Aug. 4, 2009]. Retrieved from the Internet: <URL: http://www.sap.com/solutions/business-suite/scm/pdf/RN_APO_31_EN.pdf>, pp. 86-88.

* cited by examiner

Primary Examiner — Mohammad Ali
Assistant Examiner — Sivalingam Sivanesan
(74) Attorney, Agent, or Firm — Fish & Richardson P.C.

(57) ABSTRACT

Order information is received for an order executable using a computer system to assemble a product from a plurality of components at a manufacturing location. A real-time record associated with the manufacturing location and being kept updated substantially in real time with order changes is updated with the order information, the real-time record associating the order with the plurality of components. For each of the plurality of components, it is determined whether a component change due to the order information meets a component-specific change criterion associated with the component. A static record is updated with the component change for any of the plurality of components required for the order where the component-specific change criterion is met. After the static record is updated, a management process configured to manage supply of at least one of the plurality of components according to the static record is initiated for the manufacturing location.

20 Claims, 4 Drawing Sheets

| | Order 2 | Order 1 | Order 3 | Order 4 | Order 5 | Order 6 | Order 7 | | Order n |
|---|---|---|---|---|---|---|---|---|---|
| Material A | 1 | 0 | 0 | 0 | 1 | 1 | 0 | 0 | ... |
| Material B | 0 | 1 | 1 | 1 | 1 | 1 | 0 | 1 | ... |
| Material C | 1 | 0 | 1 | 0 | 1 | 1 | 0 | 1 | ... |
| Material D | 1 | 1 | 1 | 1 | 0 | 0 | 1 | 0 | ... |
| Material E | 1 | 0 | 1 | 0 | 1 | 1 | 1 | 0 | ... |
| Material F | 1 | 1 | 0 | 1 | 1 | 0 | 1 | 1 | ... |
| Material G | 0 | 0 | 1 | 0 | 1 | 1 | 0 | 1 | ... |
| | 0 | 0 | 1 | 1 | 0 | 0 | 0 | 0 | ... |
| Material n | ... | ... | ... | ... | ... | ... | ... | ... | ... |

FIG. 2

MANUFACTURING RESOURCE PLANNING USING A COMPONENT MANAGEMENT SYSTEM

TECHNICAL FIELD

This document relates to planning of production and material requirements in a manufacturing environment.

BACKGROUND

A manufacturer can use production planning to determine the type and number of finished products to produce which can be based on sales orders. In order to manufacture each finished product, the material requirements (e.g., parts or components needed) for each finished product must be met in the manufacturing plant. The manufacturer can use material requirements planning to plan the type and quantity of each of the components (e.g., materials or parts) needed for a manufacturing and purchasing process for the production of the finished products. Component management can assure that the type and number of components needed for the production of the finished goods is available when needed at the manufacturing plant assembling the finished good.

SUMMARY

In a first aspect, a computer-implemented method for component management based on production planning includes receiving, in a computer system, order information for a first order to be executed using the computer system to assemble a first product from a plurality of components at a manufacturing location. The method includes updating a real-time record with the order information, the real-time record associated with the manufacturing location and being kept updated substantially in real time with order changes, the real-time record associating the first order with the plurality of components. The method includes determining, for each of the plurality of components, whether a component change due to the order information meets a component-specific change criterion associated with the component. The method includes updating a static record with the component change for any of the plurality of components required for the first order where the component-specific change criterion is met. The method includes initiating, after the static record is updated, a management process regarding the plurality of components for the manufacturing location, the management process configured to manage supply of at least one of the plurality of components according to the static record.

Implementations can include any or all of the following features. The method can further include creating the static record by copying the real-time record at a selected time. The method can further include creating a new static record at a later time than the selected time, the new static record replacing the static record in managing the supply of the plurality of components, the static record created by copying a current version of the real-time record at the later time. The order information can include at least one selected from the group consisting of: the first order is being modified, the first order is being added to planned production, and the first order is being removed from the planned production. At least some of the plurality of components can be assigned to a group, and the component-specific change criterion can be commonly assigned based on the group. The group can be created based on component type. The group can be created based on vendor. The determination regarding the component-specific change criterion can be performed based on each occasion when the real-time record is updated. The component-specific change criterion can include a binary matrix where, for each order, binary indicators specify whether the plurality of components are included in the order. The component-specific change criterion can include a flat file specifying whether the plurality of components are included in the order. The method can further include determining, before the determination regarding the component-specific change criterion, whether any of the plurality of components is associated with a real-time flag indicating that the static record is updated regarding the component without regard to the component-specific change criterion.

The method can be implemented using a computer program product tangibly embodied in a computer-readable storage medium and comprising instructions that when executed by a processor perform the method.

In a second aspect, a computer program product is tangibly embodied in a computer-readable storage medium and includes instructions that when executed by a processor perform a method for component management based on production planning. The method includes receiving, in a computer system, information that corresponds to at least a first order to be executed using the computer system, the first order corresponding to assembling a first product at a manufacturing location. The method includes updating a real-time record with the information, the real-time record including multiple entries corresponding, respectively, to multiple orders planned for the manufacturing location and being kept updated substantially in real time with order changes, each of the entries associating one of the multiple orders with a corresponding plurality of components to be assembled per the order. The method includes determining, for each of the plurality of components required for the first order, whether a component change due to the first order meets a component-specific change criterion associated with the component. The method includes updating a static record with the component change for any of the plurality of components required for the first order where the component-specific change criterion is met. The method includes initiating, after the static record is updated, a purchasing process for the plurality of components for the manufacturing location, the purchasing process configured to control, according to the static record, purchasing of at least one of the plurality of components for use at the manufacturing location.

Implementations can include any or all of the following features. The order information can include at least one selected from the group consisting of: the first order is being modified, the first order is being added to planned production, and the first order is being removed from the planned production. At least some of the plurality of components can be assigned to a group, and the component-specific change criterion can be commonly assigned based on the group. The group can be created based on component type. The group can be created based on vendor. The determination regarding the component-specific change criterion can be performed based on each occasion when the real-time record is updated. The method can further include determining, before the determination regarding the component-specific change criterion, whether any of the plurality of components is associated with a real-time flag indicating that the static record is updated regarding the component without regard to the component-specific change criterion.

The details of one or more implementations are set forth in the accompanying drawings and the description below. Other

DESCRIPTION OF DRAWINGS

FIG. 2 is an exemplary real-time record illustrating orders and materials used for a deviation calculation.

Like reference symbols in the various drawings indicate like elements.

DETAILED DESCRIPTION

Figure 1:
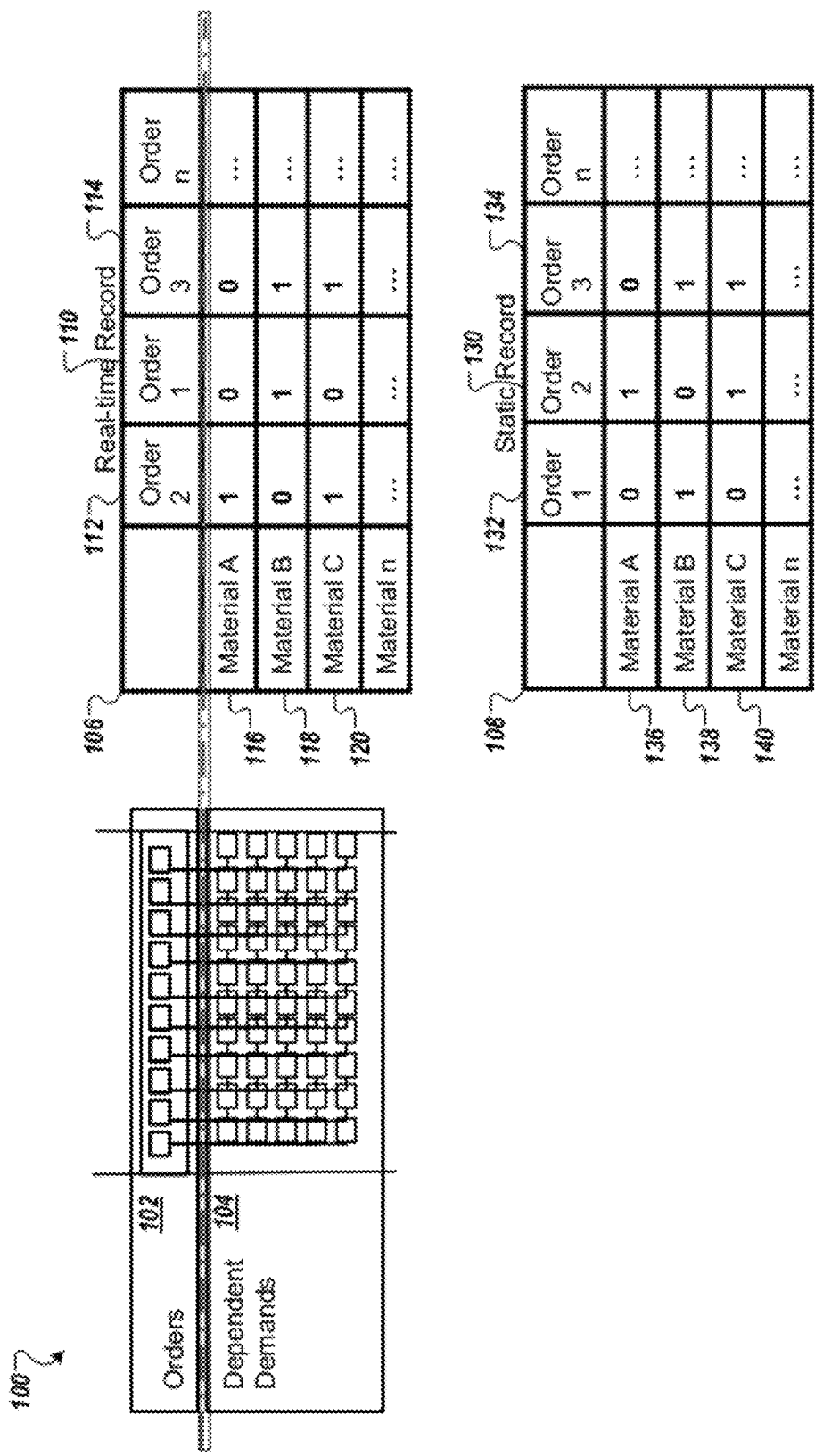
FIG. 1 is a block diagram illustrating an exemplary component management system that uses a real-time record and a static record.

FIG. 1 is a block diagram illustrating an exemplary component management system 100 that uses a real-time record 106 and a static record 108. An enterprise (e.g., a company) can use the component management system 100 in a manufacturing assembly planning and execution process. The enterprise can receive orders for products produced by the manufacturing assembly planning and execution process.

The enterprise can use integrated product and process engineering (e.g., iPPE by SAP AG) to maintain master data needed to create and maintain a bill of materials for a product based on a received order. A bill of materials can be a list of components (e.g., raw materials, sub-assemblies, intermediate assemblies, parts) needed to assemble and manufacture the product ordered. The bill of materials can include a component name, the quantities of each component needed to manufacture the finished product and a supply chain source for the component. A bill of materials explosion breaks apart each assembly or sub-assembly listed in the bill of materials into its component parts.

The enterprise can use supply chain planning applications that can increase the enterprise's overall knowledge of the supply chain and can provide forecasting, planning and optimization functions for supply chain management. For example, SAP Advanced Planner and Optimizer (APO) software manufactured by SAP AG can provide supply chain planning and management functions to the enterprise.

The enterprise can implement model-mix planning and sequencing for a manufacturing location for different product models, types and configurations assembled and manufactured using a network of production lines located in the manufacturing location. Model-mix planning and sequencing can integrate an order level 102 with a dependent demand level 104. The dependent demand level 104 can associate the quantity and type of components used to manufacture a product with the order for the product. Each order received, changed or cancelled can affect the dependent demand level, altering the type and quantity of components or materials needed for a manufacturing process. Demands for components can change rapidly on a real-time basis reflecting the multitude of orders that the enterprise can receive, change or cancel.

The component management system 100 can use the integration between an order level 102 and a dependent demand level 104 in a production planning process to generate or update the real-time record 106 where the real-time record 106 can generate or update the static record 108. For example, the order level 102 can track individual manufacturing orders, such as those for complex products like automobiles or consumer electronics. Accordingly, one order at the level 102 can correspond to one or more products that are made up from multiple components. The dependent demand level 104, in turn, can track the material requirements or component demands that depend from the respective orders. For example, an automobile or an electronic device require many separate components to be assembled.

The enterprise can use material requirements planning to plan the material requirements for the manufacturing assembly planning and execution process. Material requirements planning can guarantee material availability for product assembly and manufacture. Material requirements planning can take into consideration existing enterprise stock levels, and existing purchase and production orders using defined planning rules. For example, SAP Material Requirements Planning (MRP) software manufactured by SAP AG can perform material requirements planning for all products manufactured by the enterprise.

For example, an enterprise can receive orders to assemble and manufacture finished products where each order can have dependent demands. The orders may require the use of specific components (e.g., materials). The orders may require assembly in a specific manufacturing location. The manufacturing location may assemble a plurality of different products. The enterprise can use material requirements planning to determine the components needed per order in a specific manufacturing location. Material requirements planning can perform a bill of materials explosion on planned orders and process the bill of materials explosions to calculate the type and quantity of each component required to fulfill the orders in the manufacturing location.

In some implementations, material requirements planning can use a rapid planning matrix (RPM) technology in real-time to show the results of the bill of materials explosion for each order. The RPM technology can generate a real-time bit-matrix of materials needed per order (e.g., real-time record 106) where a "1" indicates the order uses the material and a "0" indicates the order does not use the material. For example, in a make-to-order scenario, SAP Supply Chain Management (SCM) APO software manufactured by SAP AG can include a model-mix planning and sequencing that can be integrated in real-time with a rapid planning matrix (RPM). In some implementations, the material requirements planning may generate, in real-time, a flat file list of the materials needed per order for a specific manufacturing location.

An enterprise can receive new orders, changes to existing orders and cancellation of existing orders for products. The changes can affect the material requirements for the order. For example, a manufacturing location that assembles and manufactures automobiles may have an initial order for a red Model X sedan. Before the order is executed, the manufacturer or another entity changes the color of the sedan from red to blue. In another example, the manufacturing location may have an order for a green Model X sedan cancelled. In another example, the manufacturing location may have an order for a white Model X sedan added. Any such changes (order modifications, additions and cancellations) can require a change in the components (e.g., materials) needed to assemble and manufacture the ordered automobile. That is, the dependent demands can vary depending on changes in the orders. For example, this change can affect the total number of components needed in the manufacturing location in order for the manufacturing location to meet its production requirements.

The enterprise can receive the order changes for products on a real-time basis. The enterprise can use integrated product and process engineering to update the master data needed to maintain a bill of materials for an existing order. The enterprise can use integrated product and process engineering to create the master data needed to create a bill of materials for a new product order. The enterprise can use integrated product and process engineering to delete the master data and bill of materials for a cancelled product order.

Material requirements planning can track the order changes for material planning purposes. The component management system 100 can couple production planning with the material requirements planning. The material requirements planning can perform a bill of materials explosion on the updated planned orders and process the bill of materials explosions to calculate the type and quantity of each component required to fulfill the orders in the manufacturing location. Material requirements planning can use RPM technology in real-time to show the results of the bill of materials explosion for each order.

The component management system 100 can update, in real-time or substantially in real time, the real-time record 106 with the manufacturing changes (e.g., orders modified, deleted (cancelled) or added). The real-time record 106 can be associated with the manufacturing location that processes the product orders (assembles and manufactures the product).

In some implementations, the component management system 100 can use the information in the real-time record 106 for production planning to determine the materials needed to assemble and manufacture the ordered products at the manufacturing location. As described above, the real-time integration between model-mix planning and sequencing and a rapid planning matrix (RPM) can allow updates to production planning on a real-time basis, tightly coupling the production planning to the material requirements planning. For example, updates to the real-time record 106 can occur once per second, or at shorter or longer time intervals. The component management system 100 can use the real-time record 106 to determine the quantity and type of components the manufacturing location needs to meet production demands. Using the real-time record 106 to determine component procurement needs on a real-time basis can be too dynamic as a multitude of product order changes can occur in a short time frame, particularly in a high volume production environment. Additionally, the component management system 100 may need to use system resources to manage and update the purchasing and material replenishment for the manufacturing location.

In some implementations, the component management system 100 can use the information in the real-time record 106 on a non-real time basis for production planning to determine the materials needed to assemble and manufacture the ordered products at the manufacturing location. For example, the enterprise can use the component management system 100 for material requirements planning on a daily basis. Material requirements planning can use RPM technology once per day to show the results of the bill of materials explosion for each order. The material requirements planning can perform a bill of materials explosion on planned orders and process the bill of materials explosions to calculate the type and quantity of each component required to fulfill the orders in the manufacturing location. Using the real-time record 106 to determine component procurement needs on a daily basis may not provide timely enough information to the purchasing and material replenishment process for the manufacturing location. The assembly and manufacture of products at the manufacturing location may be delayed due to lack of available materials in the manufacturing location.

Referring to FIG. 1, for the real-time record 106, each product order (e.g., order 1,2,3) has associated with it a real-time record entry 110, 112, 114 indicating one or more of materials 116, 118, 120, respectively, needed for each product order. As described above, the component management system 100 can update and change the real-time record 106 as product orders change.

The component management system 100 can include the static record 108. In examples below, it will be described that the record 108, rather than the record 106, can be used for managing the requirements for components and/or other materials that are necessary for completing the scheduled orders. The component management system 100 can initially create the static record 108 by making a copy of the real-time record 106 or by otherwise transferring some or all contents from the record 106 to the record 108. In some implementations, the static record 108 can be a copy of the real-time record 106 at a particular point in time later than the initial creation time for the static record 108 (e.g., the static record 108 can be a "snapshot" of the real-time record 106). The component management system 100 can determine when the point in time can occur.

Similar to the real-time record 106, in the static record 108 each product order (e.g., order 1,2,3) has associated with it a static record entry 132, 130, 134, respectively, indicating the materials 136, 138, 130 needed for each product order. In some implementations, the component management system 100 can update the static record 108 based on the outcome of a comparison of the real-time record 106 to the static record 108. The update can occur based on a component-specific change criterion. Each material can have associated with it a component-specific change criterion.

The real-time record (e.g., real-time record 106) can reflect manufacturing changes. The manufacturing changes can result in modified orders, cancelled orders or changed orders. The manufacturing changes can also reflect the order processing sequence. In some implementations, the static record 108 may not immediately reflect the change in order sequence that has been made in the record 106. For example, in the real-time record 106 record entry 112 (order 2) is scheduled to be initiated before record entry 110 (order 1). The static record 108, in contrast, can reflect an earlier version of the record 106 and therefore maintains the orders in numerical order where record entry 132 (order 1) is before record entry 130 (order 2).

The comparison of the real-time record 106 to the static record 108 can occur in a specific time frame (e.g., hourly, daily, weekly, monthly) determined by the component management system 100. For example, the component management system 100 can compare the real-time record 106 to the static record 108 on a daily basis. If the component-specific change criterion is met for one or more materials, the static record 108 can be updated to reflect the changes. In some implementations, the time frame selected to compare the real-time record 106 to the static record 108 can be selected based on a material replenishment ordering schedule. If material replenishment ordering occurs on a daily basis, the component management system 100 may want to compare the real-time record 106 to the static record 108 on a daily basis.

For example, the component management system 100 can compare the real-time record 106 to the static record 108 as frequently as every day and as infrequently as every month, or at any longer or shorter time interval. For example, the determination of the frequency of the occurrence of the comparisons can depend on the production volumes for the manufacturing location. In a high volume manufacturing environment, the component management system 100 may perform frequent comparisons in order to guarantee an uninterrupted supply of materials for the assembly and manufacturing of products.

In some implementations, the component-specific change criterion can be a deviation change in the quantity of the material (e.g., a deviation from a set point) needed for production. In some implementations, the component management system 100 can compare the bit pattern for a material in the real-time matrix 106 to the bit pattern for the same material in the static matrix 106 on an order-by-order basis to determine the material changes. For example, a plus or minus ten percent change in the quantity of a specific material in the real-time record 106 as compared to the quantity of the same material in static record 108 can cause the component management system 100 to update the static record 108 for that material.

In some implementations, the component management system 100 can place the materials needed for the assembly and manufacture of the product order into groups. The component management system 100 can associate and apply the component-specific change criterion to the group of materials. For example, a materials group can include a group of materials that are the same product type (e.g., a group of tires, a group of steering wheels). In another example, a vendor group can include a group of materials procured from the same vendor. For example, the component-specific change criterion can be chosen such that materials in a particular vendor group, where material procurement from the vendor requires long lead times, can be ordered when the deviation change in the quantity of the material is at a smaller amount compared to the deviation change in the quantity of a material from a vendor that does not require long lead times.

In some implementations, a material in the static record 108 can be associated with a real-time flag. When the component management system 100 compares the real-time record 106 to the static record 108, the system 100 can automatically update the static record for the real-time flagged material without regard to the component-specific change criterion.

In some implementations, the component management system 100 can use the information in the static record 108 for production planning to determine the materials needed to assemble and manufacture the ordered products at the manufacturing location. The component management system 100 can use the static record 108 to couple production planning to material requirements planning. The component management system 100 can determine the coupling factor using the component-specific change criterion. The smaller the deviation change between the real-time record 106 and the static record 108 that can trigger an update of the static record 108, and the smaller the amount of time between comparisons of the real-time record 106 to the static record 108, the tighter the coupling.

The component management system 100 can use the static record 108 for material requirements planning in production planning to manage the supply of materials in a manufacturing location. The component management system 100 can sum up the material demands indicated by the material entries in the static record 108 and place the demands into material "buckets" on a timed basis (e.g., daily, weekly, monthly). In some implementations, the component management system 100 can update the material buckets each time the system 100 compares the real-time record 106 to the static record 108. In some implementations, the component management system 100 can update the material buckets at a time different from the comparison of the real-time record 106 to the static record 108, performing the bucket updates more or less frequently.

For example, the frequency of the material bucket updates can depend on the production volume in a manufacturing location. High volume manufacturing locations may require more frequent material bucket updates in order to guarantee the materials are available for the assembly and manufacture of products.

The component management system 100 can manage a material replenishment process based on the determined material demands. The component management system 100 can place material orders based on the material demands. In some implementations, the component management system 100 can determine component-specific change criterion based on specific material replenishment issues. For example, the component management system 100 can determine the deviation change in a material that triggers the update of the static record 108 from the real-time record 106 based on the purchasing lead time for the material. For example, material A may require a plus or minus ten percent deviation change to trigger an update of the static record 108 as material A has a long purchasing lead time. For example, material B may require a plus or minus fifty percent deviation change in order to trigger an update of the static record 108 as material B has a shorter purchasing lead time and therefore its inventory can be replenished faster.

For example, material A may be available for purchase only in a specific lot size (e.g., a 10 piece lot). If the demand for material A changes from 5 pieces to 7 pieces, it is not necessary to order an additional lot of material A. However, if the demand for material A changes from 5 pieces to 100 pieces, it may be necessary to order ten additional lots of material A. The component management system 100 can set the component-specific change criterion for material A to update the static record entry for material A (e.g., material 136) when the change between the real-time record entry for material A (e.g., material 116) is greater than the lot size (e.g., greater than 10 pieces).

FIG. 2 is an exemplary real-time record 200 illustrating orders and materials used for a deviation calculation. The real-time record 200 can be included in the component management system 100 of FIG. 1. As described in FIG. 1, the component-specific change criterion for a material can be a deviation change in the quantity of the material (e.g., a deviation from a set point) needed for production. The purchasing and materials replenishment process for the manufacturing location can drive the determination of the deviation change.

In some implementations, a component-specific change criterion can be a deviation change in the quantity of a material needed for production between the material quantity specified in the real-time record 200 and the material quantity specified in a static record. The component management system 100 can sum up the material demands for each material in both the real-time record 200 and the static record and place the material demands for the real-time record 200 and the static record into a real-time material bucket and a static material bucket respectively. The component management system 100 can perform a deviation calculation between the real-time material bucket and the static material bucket. If the maximum allowed deviation of the material specified by the component-specific change criterion for the material is met or exceeded, the component management system 100 can update the static record with the new material requirements for the material. In some implementations, the component management system 100 can perform a deviation calculation and static record update for each material in a real-time record.

In some implementations, the component management system 100 can identify the orders (record entry 204, 206,

208, 210 and order 3, 4, 5, 6 respectively) whose material requirements are fulfilled in the next purchasing and materials replenishment process. The component management system 100 can use the record entries for the identified orders as those to compare when a trigger occurs for a comparison to be performed between the real-time record 200 and the static record.

In some implementations, the component management system 100 can identify a group of materials within the identified orders to form a relevant material group 202. The component management system 100 can sum up the material demands for each material in the material group 202 in both the real-time record 200 and the static record. The component management system 100 can then place the material demands for each of the materials in the material group 202 in the real-time record 200 and the static record into a real-time material bucket and a static material bucket respectively. The component management system 100 can perform a deviation calculation between the real-time material bucket and the static material bucket. If the maximum allowed deviation of one or more materials in the material group 202 is met or exceeded, the component management system 100 can update the static record with the new material requirements for each of the materials in the material group 202 whose maximum allowed deviation was either met or exceeded. In some implementations, if the maximum allowed deviation of one or more materials in the material group 202 is met or exceeded, the component management system 100 can update the static record with the material requirements for all of the materials in the material group 202. In some implementations, the component management system 100 can update the static record with the material requirements for orders outside of the material group.

Figure 3:
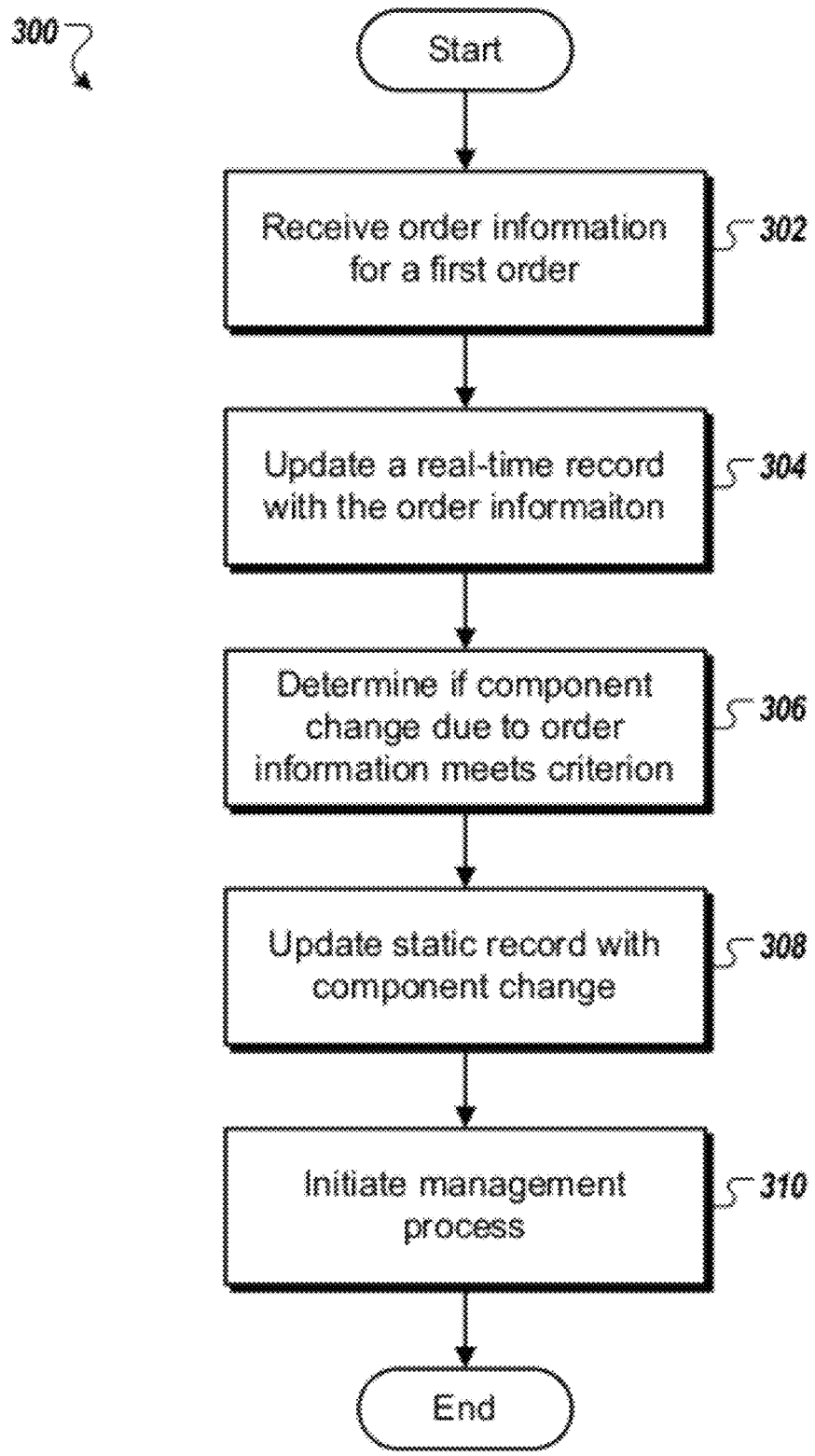
FIG. 3 is a flow chart of exemplary operations that can perform component management.

FIG. 3 is a flow chart of exemplary operations 300 that can perform component management. The operations 300 can be performed by a processor that executes instructions stored in a computer-readable medium. For example, a computer device operated by an enterprise can perform the operations 300.

A process begins at step 302 by receiving order information for a first order. The enterprise can receive the order and can use integrated product and process engineering to maintain master data needed to create and maintain a bill of materials for the product based on the received order information. A manufacturing location can assembled the order into a first product using a plurality of materials.

For example, the enterprise can provide the component management system 100, as described with reference to FIG. 1. The component management system 100 can update a real-time record with the order information in step 304. For example, the component management system 100 can use material requirements planning to perform a bill of materials explosion. In some implementations, material requirements planning can use RPM technology in real-time to show the results of the bill of materials explosion for each order. The component management system 100 can use the integration between an order level 102 and a dependent demand level 104 in a production planning process to generate or update a real-time record.

The component management system 100 can determine if a component change due to the order information meets a component-specific change criterion in step 306. For example, the component management system 100 can compare the real-time record with a static record initially created by the component management system 100 to determine if component changes for each component meets or exceeds the component-specific change criterion associated with the component.

If the component change due to the order information meets or exceeds the component-specific change criterion, the component management system 100 can update the static record with the component change in step 308. The component management system 100 can perform this update for all components in the static record that meet or exceed their associated component-specific change criterion. The component management system 100 can perform this update for a previously identified subset of components in the static record that meet or exceed their associated component-specific change criterion.

In step 310, the component management system 100 can initiate a management process to manage the supply of at least one of the components in the static record where the system 100 has updated the record entry for the component (e.g., record entry 136 for Material A). For example, the component management system 100 can sum up the material demands indicated by the material entries in the static record entry for the component (e.g., record entry 136 for Material A) and place the demands into a material bucket for the component. The demands in the material bucket can be used to manage the supply of the component into the manufacturing location.

Figure 4:
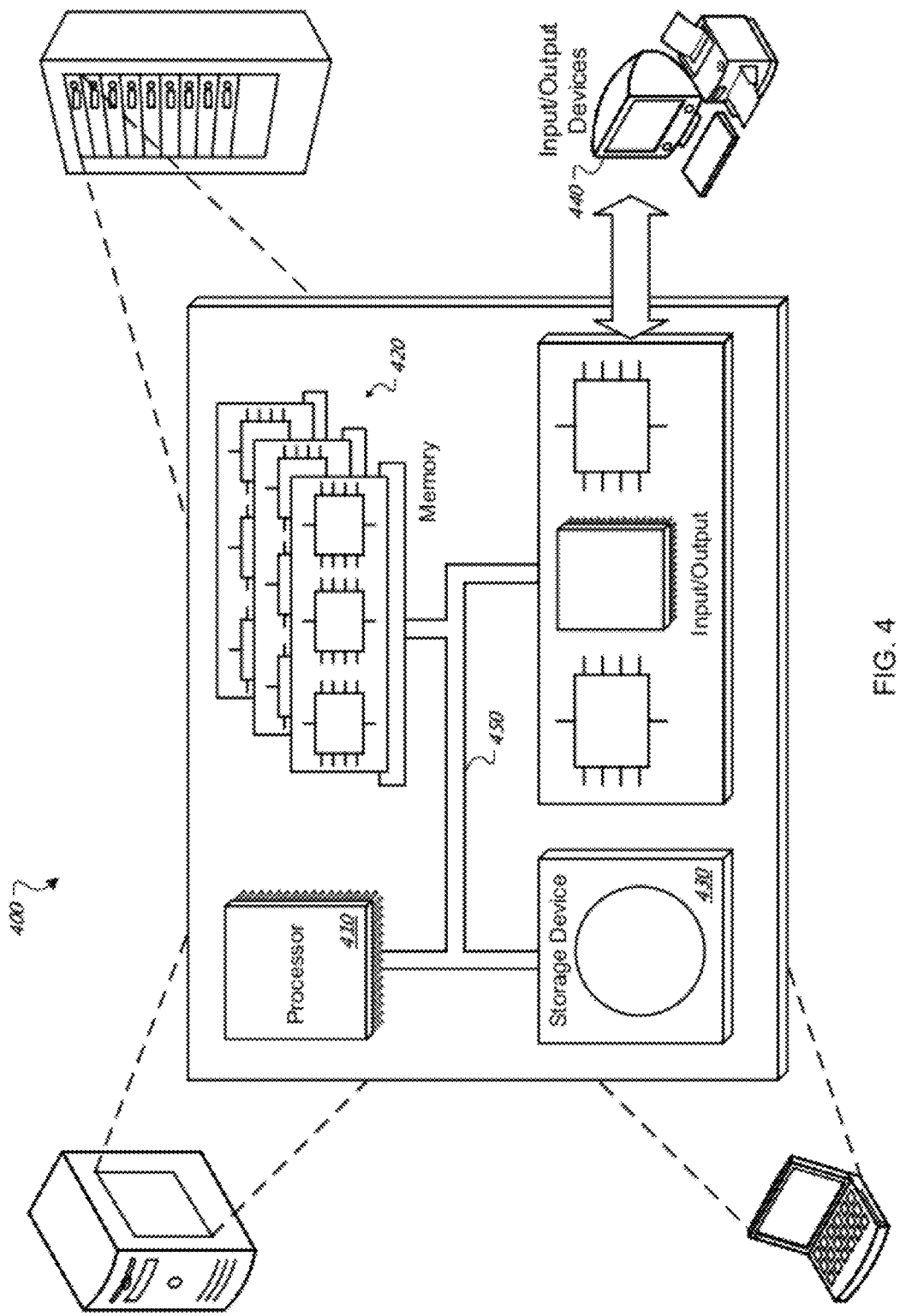
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 is a volatile memory unit in some implementations and is a non-volatile memory unit in other implementations.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for component management based on production planning, the method comprising:

receiving, in a computer system, order information for a first order to be executed using the computer system to assemble a first product from a plurality of components at a manufacturing location;

updating a real-time record with the order information, the real-time record associated with the manufacturing location and being kept updated substantially in real time with order changes, the real-time record associating the first order with the plurality of components;

determining, for each of the plurality of components, whether a required quantity of the component in the real-time record has changed, due to the updating of the real-time record with the order information, by at least a component-specific threshold amount associated with the component;

based on the determining, updating a static record with required quantities from the real-time record for at least a portion of the plurality of components that are used to assemble the first product of the first order, wherein the static record is updated when the required quantities for the at least a portion of the plurality of components have changed in the real-time record by at least corresponding component-specific threshold amounts; and initiating, after the static record is updated, a management process regarding the plurality of components for the manufacturing location, the management process configured to manage supply of at least one of the plurality of components according to the static record.

2. The computer-implemented method of claim 1, further comprising creating the static record by copying the real-time record at a selected time.

3. The computer-implemented method of claim 2, further comprising creating a new static record at a later time than the selected time, the new static record replacing the static record in managing the supply of the plurality of components, the static record created by copying a current version of the real-time record at the later time.

4. The computer-implemented method of claim 1, wherein the order information comprises at least one selected from the group consisting of: the first order is being modified, the first order is being added to planned production, and the first order is being removed from the planned production.

5. The computer-implemented method of claim 1, wherein at least some of the plurality of components are assigned to a group, and wherein a component-specific threshold amount is commonly assigned based on the group.

6. The computer-implemented method of claim 5, wherein the group is created based on component type.

7. The computer-implemented method of claim 5, wherein the group is created based on vendor.

8. The computer-implemented method of claim 1, wherein the determining is performed based on each occasion when the real-time record is updated.

9. The computer-implemented method of claim 1, wherein the real-time record includes a binary matrix where, for each order, binary indicators specify whether the plurality of components are included in the order.

10. The computer-implemented method of claim 1, wherein the real-time record includes a flat file specifying whether the plurality of components are included in the order.

11. The computer-implemented method of claim 1, further comprising determining, before the determination regarding the component-specific threshold amount, whether any of the plurality of components is associated with a real-time flag indicating that the static record is updated regarding the component without regard to the component-specific threshold amount.

12. The computer-implemented method of claim 1, wherein a component-specific threshold amount for a particular component from the plurality of components is based on a lot size of the particular component.

13. A computer program product tangibly embodied in a computer-readable storage medium and comprising instructions that when executed by a processor perform a method for component management based on production planning, the method comprising:

receiving, in a computer system, order information for a first order to be executed using the computer system to assemble a first product from a plurality of components at a manufacturing location;

updating a real-time record with the order information, the real-time record associated with the manufacturing location and being kept updated substantially in real time with order changes, the real-time record associating the first order with the plurality of components;

determining, for each of the plurality of components, whether a required quantity of the component in the real-time record has changed, due to the updating of the real-time record with the order information, by at least a component-specific threshold amount associated with the component;

based on the determining, updating a static record with required quantities from the real-time record for at least a portion of the plurality of components that are used to assemble the first product of the first order, wherein the static record is updated when the required quantities for the at least a portion of the plurality of components have changed in the real-time record by at least corresponding component-specific threshold amounts; and initiating, after the static record is updated, a management process regarding the plurality of components for the manufacturing location, the management process configured to manage supply of at least one of the plurality of components according to the static record.

14. A computer program product tangibly embodied in a computer-readable storage medium and comprising instructions that when executed by a processor perform a method for component management based on production planning, the method comprising:

receiving, in a computer system, information that corresponds to at least a first order to be executed using the computer system, the first order corresponding to assembling a first product at a manufacturing location;

updating a real-time record with the information, the real-time record including multiple entries corresponding, respectively, to multiple orders planned for the manufacturing location and being kept updated substantially in real time with order changes, each of the entries associating one of the multiple orders with a corresponding plurality of components to be assembled per the order;

determining, for each of the plurality of components required for the first order, whether a required quantity of the component change in the real-time record has changed, due to the updating of the real-time record with the information, by at least a component-specific threshold amount associated with the component;

based on the determining, updating a static record with required quantities from the real-time record for at least a portion of the plurality of components that are used to assemble the first product of the first order, wherein the static record is updated when the required quantities for the at least a portion of the plurality of components have changed in the real-time record by at least corresponding component-specific threshold amounts; and initiating, after the static record is updated, a purchasing process for the plurality of components for the manufacturing location, the purchasing process configured to control, according to the static record, purchasing of at least one of the plurality of components for use at the manufacturing location.

15. The computer program product of claim 14, wherein the order information comprises at least one selected from the group consisting of: the first order is being modified, the first order is being added to planned production, and the first order is being removed from the planned production.

16. The computer program product of claim 14, wherein at least some of the plurality of components are assigned to a group, and wherein a component-specific threshold amount is commonly assigned based on the group.

17. The computer program product of claim 16, wherein the group is created based on component type.

18. The computer program product of claim 16, wherein the group is created based on vendor.

19. The computer program product of claim 14, wherein the determining is performed based on each occasion when the real-time record is updated.

20. The computer program product of claim 14, further comprising determining, before the determination regarding the component-specific threshold amount, whether any of the plurality of components is associated with a real-time flag indicating that the static record is updated regarding the component without regard to the component-specific threshold amount.

* * * * *